May 16, 1933. F. L. HUNTER, JR 1,909,680
ELECTRODE AND METHOD OF MAKING THE SAME
Filed June 30, 1930
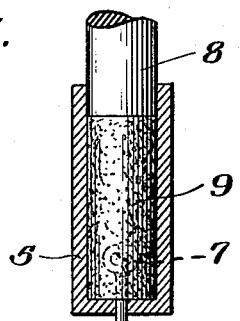
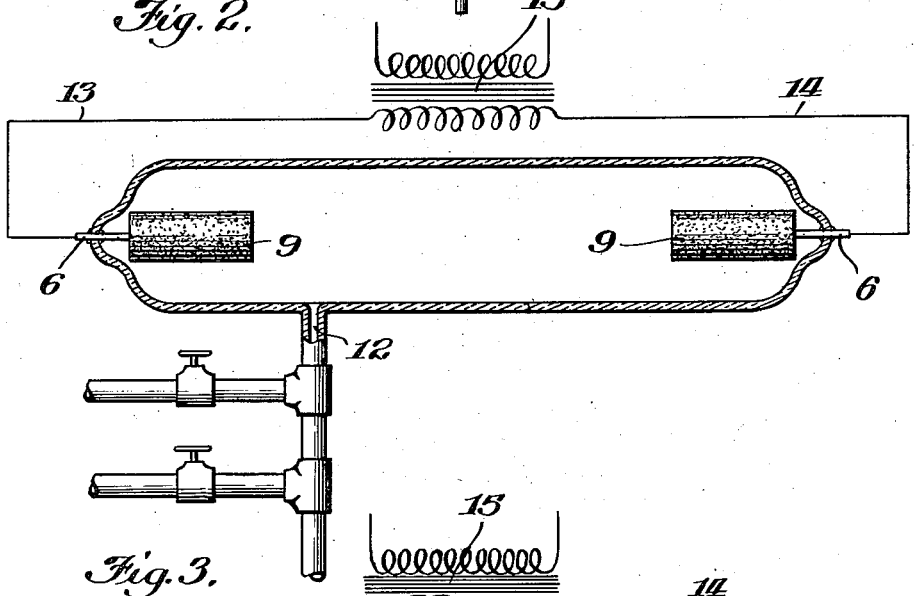
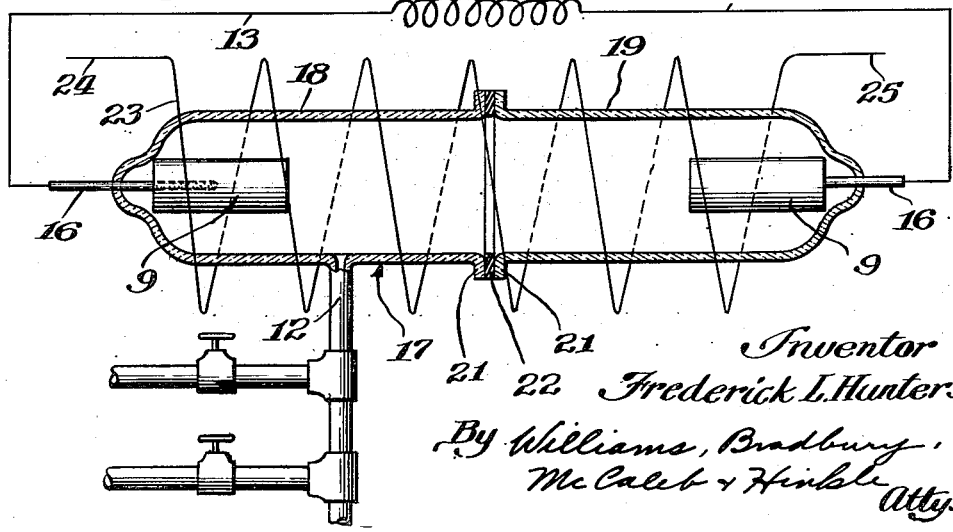
Inventor
Frederick L. Hunter Jr.
By Williams, Bradbury,
McCaleb & Hinkle
Attys.

Patented May 16, 1933

1,909,680

UNITED STATES PATENT OFFICE

FREDERICK L. HUNTER, JR., OF LAKE BLUFF, ILLINOIS, ASSIGNOR TO FANSTEEL PRODUCTS COMPANY, INC., OF NORTH CHICAGO, ILLINOIS, A CORPORATION OF NEW YORK

ELECTRODE AND METHOD OF MAKING THE SAME

Application filed June 30, 1930. Serial No. 464,750.

This invention relates in general to gaseous conduction apparatus or vacuum tubes, and has more particular reference to the production and provision of a novel electrode for use in such apparatus or tubes.

In the manufacture of gaseous conduction devices or tubes the electrodes are mounted in a closed receptacle to which a noble gas, such as neon, argon or helium, may be admitted. An electrical arc is established between the electrodes, and where such a noble gas is employed it is alternately replenished and exhausted until all of the impure gases occluded by the electrodes and the walls of the tube have been removed. The tube may then be supplied with a suitable gas at the desired pressure and sealed before service.

Various precautions are taken in order to completely degasify the tubes and electrodes and to completely exhaust the tube before sealing because the presence of a very small amount of foreign gases or vapors as impurities greatly increases the resistance of the tube during its operation, causes color changes in the light from the tube and impairs its luminous efficiency.

Notwithstanding these precautions, the phenomenon known as "sputtering" has heretofore presented a problem, the solution of which has been a prime desideratum of exhaustive experimental research. Irrespective of the causes of sputtering, its effects include the gradual depositing of the electrode material on the walls of the tube, thereby forming a thin coating of the electrode material on the tube walls, which occludes and imprisons the gas, which acts as a condenser plate with nearby grounded objects, and which causes heating of the tube walls. This occlusion of the gases diminishes the gas pressure within the tube, and causes the discharge between the electrodes to become more feeble or to cease altogether.

A prime object of the present invention is the production and provision of a novel electrode which will overcome the foregoing objections.

An important object of the invention is the provision of a substantially non-sputtering electrode for gaseous conduction devices or vacuum tubes.

Another important object of this invention is the production of an efficient electrode for gaseous conduction devices such as neon tubes or signs which will withstand relatively high temperatures with substantially no sputtering.

A still further object of the invention is to provide a novel method of treating the electrodes of a gaseous conduction device which will be practicable, inexpensive and efficient.

A further important object of the present invention is the provision of a composite electrode comprised of metal and a metalloid for use as a non-sputtering electrode in neon signs or other gaseous conduction devices or tubes.

Other objects and advantages of the invention will be apparent as the following description progresses.

Referring to the drawing:

Fig. 1 is a view diagrammatically illustrating a step in a method of forming the electrodes of the invention.

Fig. 2 is a sectional view of a gaseous conduction or vacuum tube illustrative of another step in the method of making the electrode of the invention.

Fig. 3 is a view similar to that shown in Fig. 2 and schematically illustrates a modification in the novel method of the invention.

Briefly, the present invention contemplates the production and provision of an electrode comprising iron, copper, aluminum, nickel, tantalum, columbium, tungsten, or any other suitable electrode material, and a metalloid such as carbon or boron. Preferably, however, the electrode of the invention is composed of a metal having a low vapor pressure, such as a refractory metal and carbon or boron. The refractory metal may be formed to the desired shapes and sizes and mounted in a tube where the metal may be boronized or carbonized by arcing or flashing in a carbon or boron producing atmosphere. After the electrodes have been so boronized or carbonized, they may be transferred to a gaseous conduction or vacuum tube for use, or the same tube in which they were treated may be evacuated or exhausted of the boronizing or carbonizing medium and sealed for service in a well known manner.

The invention also contemplates heating a mixture of an electrode metal powder and a metalloid powder, so pressing this mixture to the desired shapes and sizes as to permit handling, and heating or sintering the formed electrode either before or after mounting it in the gaseous conduction device or vacuum tube.

To accomplish the foregoing objects, carbon, preferably in the form of lamp black or charcoal, is preheated in a closed graphite crucible to about 1500 degrees C. to volatilize any organic matter contained in the carbon and to rid it of objectionable gases. After such purification, substantially four percent by weight of the metalloid is mixed with the metal powder, such as tantalum or columbium powder, in a graphite crucible packed in lamp black. It will, of course, be understood that the invention here contemplates employing an oxide of the metal and sufficient carbon to reduce the oxide.

This mixture of tantalum and carbon is then heated in a high frequency furnace by slowly raising the temperature to about 2,000 degrees C., and maintaining this temperature for about one-half hour to chemically combine the carbon and tantalum. This composition of tantalum and carbon is then reduced to a powder by any suitable method, such as by ball-milling, after which it is heated, preferably in a tantalum vessel, to from 1600 degrees to 1700 degrees C. in a vacuum furnace to degasify it and to complete the reaction between the carbon and tantalum. This heating serves also to completely reduce whatever oxides may still be present in the composition.

This tantalum carbon powder is then placed in a shaping die 5 into which a lead wire or conductor 6, having an end 7 formed as a hook or ring, has previously been positioned so that the hook or ring 7 will be imbedded in the powder. Sufficient pressure is applied by any suitable means, such as that schematically shown at 8 in Fig. 1, to press the powder into a body 9 which may be handled.

The body 9 having the conductor 6 extending therefrom may be heated in a vacuum in the presence of carbon or a carbon producing substance, or two of these bodies may be mounted in a tube or envelope 11, as shown in Figure 2, for sintering. The tube 11 may be exhausted through a tubular port or extension 12, which is connectible with a controlled vacuum pump and a controlled source or sources of gas, not shown.

The lead wires 6 are shown connected by means of conductors 13 and 14 to a suitable source of electrical potential 15 for establishing an arc between the bodies 9, whereby to sinter the tantalum carbon bodies.

As shown in Fig. 3, the bodies 9 may be suitably formed from one of the above mentioned metals, preferably tantalum, having lead wires 16 threaded into or otherwise secured to the bodies. These bodies 9 may then be mounted in a tube similar to that already described, or, as shown, they may be detachably mounted in a two part envelope or tube 17, having separable portions 18 and 19 which are provided with complementary flanges 21 and a bushing 22 to facilitate securing the portions together. The tube 17 is then exhausted and a carbon producing gas or vapor, such as a hydro-carbon vapor, carbon monoxide, or illuminating or coal gas, is admitted through a tubular port 12. The bodies 9 are then carbonized by arcing or flashing in this gas, as provided for by the conductors 13 and 14 and the source of potential 15. In some instances it is desirable to heat the bodies 9 indirectly in order to permit the carbonization or boronization thereof. To this end an induction coil 23 may be positioned about the tube 17 and supplied with energy from any suitable source by means of leads 24 and 25. The electrodes may then be removed and mounted in the desired gaseous conduction device or tube; or, where desired, the arcing in the carbon producing atmosphere may be carried on in the device or tube in which the electrodes are to be sealed.

The novel electrode of this invention will withstand relatively high temperatures without volatilizing or evaporating, and may be made in such sizes with respect to the current density that is will not disintegrate during the operation. Such electrodes are substantially non-sputtering at the current densities for which they are designed and serve to prolong the life of the tube by virtue of its non-sputtering property.

Having thus described my invention, what I claim is new and desire to secure by Letters Patent of the United States is:

1. An electrode for gaseous conduction apparatus comprising a metal of low vapor pressure and four per cent by weight of carbon combined therewith, said electrode being adapted to withstand high temperatures without volatilizing.

2. An electrode for gaseous conduction apparatus comprising a refractory metal carbide having substantially four percent by weight of carbon.

3. A method of making electrodes which comprises mounting a pressed mixture of a finely divided metal and a metalloid in a gaseous conduction device and establishing an arc between said pressed mixture and an electrode.

4. A method of making electrodes which comprises pressing a mixture of refractory metal powder and carbon powder into bodies, mounting said bodies in a tube and establishing an arc between said bodies to combine the carbon and the refractory metal.

5. A method of making electrodes which comprises pressing a mixture of carbon and tantalum powders about a lead wire and subsequently sintering the mixture by arcing between the pressed mixtures and an electrode.

6. A method of making substantially non-sputtering tantalum electrodes which comprises mounting a pressed body of finely divided metal in a gaseous conduction device, supplying a metalloid producing gas to said gaseous conduction device, and combining the metalloid of said gas with said pressed powder by passing an electrical current between said pressed powder and an electrode.

7. A method of treating tantalum electrodes in a gaseous conduction device to render the electrodes substantially non-sputtering, which comprises inductively heating the tantalum electrodes in a tube containing illuminating gas, exhausting said tube and introducing a noble gas therein.

8. A substantially non-sputtering tantalum electrode for gaseous conduction devices, which consists of a composite body of finely divided tantalum and carbon, the carbon making up substantially four per cent by weight of said body, and an electrode support having an end incorporated in said body.

9. A receptacle containing a metalloid producing gas in combination with a body of a finely divided metal combinable with the metalloid of said gas, a leading in conductor having an end embedded in said body of finely divided metal, and means associated with said conductor and said finely divided metal for combining said metalloid and said metal.

In witness whereof, I hereunto subscribe my name this 20th day of June, 1930.

FREDERICK L. HUNTER, Jr.